United States Patent
Mitsui et al.

(10) Patent No.: US 7,259,197 B2
(45) Date of Patent: Aug. 21, 2007

(54) ULTRA HIGH-STRENGTH HYDRAULIC CEMENT COMPOSITIONS

(75) Inventors: Kenrou Mitsui, Inzai (JP); Masarou Kojima, Inzai (JP); Keishirou Okamoto, Inzai (JP); Toshio Yonezawa, Inzai (JP); Mitsuo Kinoshita, Gamagori (JP); Masahiro Iida, Gamagori (JP); Kazuhide Saitou, Gamagori (JP); Shinji Tamaki, Gamagori (JP)

(73) Assignees: Takenaka Corporation, Osaka (JP); Takemoto Yushi Kabushiki Kaisha, Aichi (JP)

( * ) Notice: Subject to any disclaimer, the term of this patent is extended or adjusted under 35 U.S.C. 154(b) by 459 days.

(21) Appl. No.: 10/976,188

(22) Filed: Oct. 27, 2004

(65) Prior Publication Data

US 2005/0150428 A1    Jul. 14, 2005

(30) Foreign Application Priority Data

Oct. 30, 2003    (JP) ............................. 2003-370291

(51) Int. Cl.
  *C04B 24/26*    (2006.01)
(52) U.S. Cl. ...................................................... 524/5
(58) Field of Classification Search ................. 526/82, 526/83, 84, 85, 271
See application file for complete search history.

(56) References Cited

U.S. PATENT DOCUMENTS

| | | | | | |
|---|---|---|---|---|---|
| 3,414,547 A | * | 12/1968 | Thompson et al. | ............ | 526/86 |
| 4,946,904 A | * | 8/1990 | Akimoto et al. | ......... | 525/327.8 |
| 4,962,173 A | * | 10/1990 | Kinoshita et al. | ............. | 528/15 |
| 5,142,036 A | * | 8/1992 | Akimoto et al. | ........... | 536/18.3 |
| 5,362,829 A | * | 11/1994 | Kinoshita et al. | ........... | 526/240 |
| 6,492,445 B2 | * | 12/2002 | Siddiqui et al. | ............ | 524/156 |
| 6,552,141 B1 | * | 4/2003 | Chmelir et al. | ............. | 526/217 |
| 6,730,764 B1 | * | 5/2004 | Ikuta et al. | ................. | 526/319 |

FOREIGN PATENT DOCUMENTS

| | | |
|---|---|---|
| JP | 2000-026437 | 1/2000 |
| JP | 2001-172324 | 6/2001 |
| JP | 2003-171156 | 6/2003 |

* cited by examiner

*Primary Examiner*—Bernard Lipman
(74) *Attorney, Agent, or Firm*—Beyer Weaver LLP (57) ABSTRACT

An ultra high-strength hydraulic cement composition contains a binder, fine aggregates, coarse aggregates, an antifoaming agent, water and a specified admixture and has a unit amount of the binder in the range of 480-1800 kg/m$^3$. Water and the binder are contained at a ratio of 10-25% and the admixture is contained in the amount of 0.2-3.5 weight parts per 100 weight parts of the binder. The binder may be cement or a mixture of cement and a microscopic powder admixture. The admixture is one or more selected from reaction mixtures obtained by specified two processes and partially or completely neutralized substances obtained from such a reaction mixture through these two processes and also a specified third process. The specified two processes include initiating a radical copolymerization process of a radical polymerizable monomer mixture containing maleic anhydride and a monomer of a specified kind in a non-aqueous system in the presence of a non-aqueous radical initiator and stopping the radical copolymerization reaction in its midst while the inversion rate of polymerization is at a specified level by adding water to the reaction system to thereby obtain a reaction mixture. The specified third process is for partially or completely neutralizing the reaction mixture.

16 Claims, 1 Drawing Sheet

FIG. 1

ULTRA HIGH-STRENGTH HYDRAULIC CEMENT COMPOSITIONS

Priority is claimed on Japanese Patent Application 2003-370291 filed Oct. 30, 2003.

BACKGROUND OF THE INVENTION

This invention relates to ultra high-strength hydraulic cement compositions (say, for the production of ultra high-strength hydraulic concrete) and more particularly to ultra high-strength hydraulic cement compositions having simultaneously a plurality of specified characteristics that are desirable to such compositions.

Ultra high-strength hydraulic cement compositions are produced by kneading water and cement together at a smaller mixing ratio than for the production of normal-strength hydraulic cement compositions. Because of their very nature, these ultra high-strength hydraulic cement compositions generally have several problems such that it takes a long time for the kneading, that the drop in fluidity with time (hereinafter referred to as the slump loss) is large, that the viscosity is too high, that the autogeneous shrinkage of the hardened object obtained from them is too large and that the strength of such a hardened object is not sufficiently high. In view of such problems, Japanese Patent Publication Tokkai 6-191918 and U.S. Pat. No. 5,466,289 disclosed the use of ultra high-quality cement dispersants as admixtures and Japanese Patent Publications Tokkai 2001-220194, 2001-48620 and 2001-278653 disclosed the use of shrinkage reducing agents as admixtures, but these prior art ultra high-strength hydraulic cement compositions cannot simultaneously solve all of the plurality of problems described above.

SUMMARY OF THE INVENTION

It is therefore an object of this invention to provide ultra high-strength hydraulic cement compositions capable of simultaneously satisfying the plurality of conditions that the time required for the kneading should be short, that the slump loss should be small, that the viscosity should be small, that the autogeneous shrinkage of the hardened object obtained from them should be small and further that the strength of such a hardened object should be sufficiently high as desired.

The present invention is based on the discovery by the present inventors as a result of their diligent studies in view of the object described above that ultra high-strength hydraulic cement compositions containing a binder, fine aggregates, coarse aggregates, an antifoaming agent, water and a specified admixture, having a specified water-to-binder ratio and a specified unit amount of the binder and further containing the specified admixture at a specified ratio with respect to the binder can satisfy these conditions.

DETAILED DESCRIPTION OF THE INVENTION

This invention relates to ultra high-strength hydraulic cement compositions characterized as comprising a binder, fine aggregates, coarse aggregates, an antifoaming agent, water and an admixture of a specified kind described below, containing the water and the binder at a ratio of 10-25%, having a unit amount of this binder in the range of 480-1800 kg/m$^3$ and containing the admixture in the amount of 0.2-3.5 weight parts per 100 weight parts of the binder. In the above, the binder is either cement or a mixture of cement and a microscopic powder admixture, and the admixture of the specified kind is one or more selected from reaction mixtures obtained by Process 1 and Process 2 and partially or completely neutralized substances obtained further by Process 3, where Process 1 is a process of initiating a radical copolymerization process of a radical polymerizable monomer mixture containing maleic anhydride and a monomer shown by Formula 1 by 97 molar % or more at a molar ratio of 50/50-70/30 in a non-aqueous system in the presence of a non-aqueous radical initiator, Process 2 is a process of stopping the radical copolymerization reaction initiated in Process 1 in the midst of the reaction when the inversion rate of polymerization defined by {(TM-UM)/TM}×100 has become 50-90% by adding water to the reaction system and thereby obtaining a reaction mixture containing a copolymer thus produced and residual monomers, TM indicating the total weight of the radical polymerizable monomer mixture at the start of the radical polymerization reaction in Process 1 and UM indicating the total weight of the residual monomers when the radical copolymerization reaction is stopped in Process 2, Process 3 is a process of partially or completely neutralizing the reaction mixture obtained in Process 2 by one or two selected from alkali metal hydroxides, alkali earth metal hydroxides and amines, and Formula 1 is given by $CH_2$=CH—$CH_2$—O—A—O—R where R is methyl group, acetyl group or hydrogen atom and A is a residual group obtained by removing all hydroxyl groups from (poly)alkyleneglycol having (poly)oxyalkylene groups formed with 1-150 oxyethylene units or a total of 2-150 oxyethylene and oxypropylene units.

Ultra high-strength hydraulic cement compositions according to this invention comprise a binder, fine aggregates, coarse aggregates, an antifoaming agent, water and an admixture, and examples of the admixture according to this invention include (1) reaction mixtures obtained by Processes 1 and 2, (2) partially or completely neutralized products of such a reaction mixture obtained further through Process 3, and one or more selected from (1) and (2). In other words, admixtures of this invention include one or more selected from the reaction mixtures (1), one or more selected from the partially or completely neutralized products of (2) and the mixtures of the above.

Process 1 is a process of initiating a radical copolymerization process of a radical polymerizable monomer mixture in a non-aqueous system in the presence of a non-aqueous radical initiator. Examples of the radical polymerizable monomer mixture that may be used include those containing maleic anhydride and monomer shown by Formula 1 by 97 molar % or more as a total and preferably by 100 molar % at a molar ratio of 50/50-70/30 or preferably 55/45-65/35.

Regarding Formula 1, R may be methyl group, acetyl group or hydrogen atom but preferably be methyl group or acetyl group.

Regarding Formula 1, examples of what A may be include (1) residual groups obtained by removing all hydroxyl groups from (poly) ethyleneglycol having within its molecule (poly)oxyethylene groups entirely made of oxyethylene units and (2) residual groups obtained by removing all hydroxyl groups from (poly)ethylene(poly)propyleneglycol having within its molecules (poly)oxyethylene(poly)oxypropylene group made of both oxyethylene units and oxypropylene units, but examples of (1) are preferable. In the case of (2), the oxyethylene units and oxypropylene units may be in random or block combination but examples with random combination are preferable. The repetition number of the oxyalkylene units (such as oxyethylene) in A may be 1-150 and preferably 15-90.

In other words, preferable monomers are those shown by Formula 1 where R is methyl group or acetyl group and A is a residual group obtained by removing all hydroxyl groups from polyethyleneglycol having polyoxyethylene groups made of 15-90 oxyethylene units.

Examples of such monomers shown by Formula 1 as explained above include (1) α-allyl-ω-methoxy-(poly)oxyethylene; (2) α-allyl-ω-methoxy-(poly)oxyethylene (poly)oxypropylene; (3) α-allyl-ω-acetoxy-(poly)oxyethylene; (4) α-allyl-ω-acetoxy-(poly)oxyethylene (poly)oxypropylene; (5) α-allyl-ω-hydroxy-(poly)oxyethylene; and (6) α-allyl-ω-hydroxy-(poly)oxyethylene-(poly)oxypropylene.

The radical polymerizable monomer mixture to be used in Process 1 is a mixture containing maleic anhydride and monomer shown by Formula 1 by 97 molar % or more as a total and preferably by 100 molar %. This means that radical polymerizable monomers of other types may be contained by 3 molar % or less. Examples of such radical polymerizable monomers of other types include styrene, vinyl acetate, acrylic acid, salts of acrylic acid, alkyl acrylates, (metha) allyl sulfonic acid and salts of (metha)allyl sulfonic acid.

Process 1 is a process of initiating a radical copolymerization process in a non-aqueous system by adding a non-aqueous radical initiator to a radical polymerizable monomer mixture as explained above. Methods of initiating a radical copolymerization process in a non-aqueous system include (1) methods of initiating a radical copolymerization process without using any solvent, and (2) methods of initiating a radical copolymerization process by using a non-aqueous solvent such as benzene, toluene, xylene, methyl isobutylketone and dioxane and dissolving the radical polymerizable monomer mixture in such a non-aqueous solvent, but the methods of (1) are preferable. A radical copolymerization reaction according to a method of (1) may be initiated, for example, by setting the radical polymerizable monomer mixture in a reactor, adding a non-aqueous radial initiator to it in a nitrogen atmosphere and heating it to 40-60° C. Examples of the non-aqueous radical initiator that may be used in Process 1 include azo initiators such as azobisisobutyronitrile and 2,2'-azobis(4-methoxy 2,4-dimethyl valeronitrile), benzoyl peroxide, lauroyl peroxide and kumene hydroperoxide.

Process 2 is a process of stopping the radical copolymerization reaction initiated in Process 1 in the midst of the reaction while the inversion rate of polymerization defined above becomes 50-90% by adding water to the reaction system and thereby obtaining a reaction mixture containing a copolymer thus produced and residual monomers. In Process 2, the radical copolymerization reaction initiated in Process 1 is stopped during the reaction while the inversion rate of polymerization defined above becomes 50-90%, or preferably 65-85%. Methods of stopping the radical copolymerization reaction in the midst of the reaction while the inversion rate of polymerization becomes 50-90%, or preferably 65-85%, include (1) method of sampling a portion of the reaction mixture from the reaction system periodically, obtaining the ratio of the generated copolymer and the residual monomers by a high-speed method of analysis such as GPC or high-speed liquid chromatography, calculating the inversion rate of polymerization by using the obtained number and thereby determining the time to stop the radical copolymerization reaction; (2) method of preliminarily obtaining the relationship between the torque of the stirrer used for the reaction system and the inversion rate of polymerization and stopping the radical copolymerization reaction on the basis of the obtained relationship at the time when the torque reaches the value corresponding to the desired inversion rate of polymerization; and (3) method of preliminarily obtaining the relationship between the time of the radical copolymerization reaction and the inversion rate of polymerization and stopping the radical copolymerization based on the obtained relationship at the time corresponding to the desired inversion rate of polymerization. From the point of view of freedom and simplicity of equipment, however, the method of (3) is preferable. In any case, if the radical copolymerization reaction is stopped in the midst when the inversion rate of polymerization is not within the range of 50-90%, ultra high-strength hydraulic cement compositions simultaneously possessing the desired plurality of functions cannot be obtained by using such an admixture.

The invention does not impose any stringent restriction regarding the temperature at the start of the radical copolymerization reaction of Process 1 or during Process 2 while the radical copolymerization reaction is continued until it is stopped in the midst but it is preferably in the range of 60-90° C. Neither is there any restriction imposed on the amount of water to be added for stopping the radical copolymerization reaction in Process 2 but it is preferably 2-10 mols per mol of the maleic anhydride used as the material.

Thus, a reaction mixture containing the generated copolymers and residual monomers is obtained by Process 2. From the point of view of the radical polymerizable monomer mixture used for the radical copolymerization reaction of Process 1, the copolymers that are generated and come to be contained in the reaction mixture are those with constituent units formed with maleic anhydride and monomers shown by Formula 1 but since this radical copolymerization reaction is stopped in the midst of Process 1 by adding water, the constituent units formed with maleic anhydride become constituent units formed with maleic acid as a result of hydrolysis of maleic anhydride. Similarly, from the point of view of the radical polymerizable monomer mixture used for the radical copolymerization reaction of Process 1, the residual monomers that come to be contained in the reaction mixture are those containing at least maleic anhydride and/or monomers shown by Formula 1, but since this radical copolymerization reaction is stopped in the midst of Process 1 by adding water, maleic anhydride becomes maleic acid as a result of hydrolysis.

There is no limitation imposed on the molecular weight of the copolymers that come to be contained in the reaction mixture in Process 2, but those with the top of peak of weight-average molecular weight (hereinafter pullulan converted weight in the measurement by gel-permeation chromatography (or GPC) of 30000-45000 are preferred. Adjustment of weight-average molecular weight can be accomplished by appropriately selecting the kind and the amount of the non-aqueous radical initiator used in Process 1, the kind and amount of the radical chain transfer agent which may be added if necessary in Processes 1 and 2 and the temperature and time of the radical copolymerization in Processes 1 and 2.

Process 3 is a process of partially or completely neutralizing the reaction mixture obtained in Process 2 by means of a basic compound to obtain partially or completely neutralized objects of the aforementioned reaction mixture. Examples of the basic compound to be used for this purpose include (1) alkali metal hydroxides such as sodium hydroxide and potassium hydroxide; (2) alkali earth metal hydroxides such as calcium hydroxide and magnesium hydroxide; and (3) amines such as ammonia and triethanol amine, but alkali metal hydroxides are preferred.

Ultra high-strength hydraulic cement compositions according to this invention comprise a binder, fine aggregates, coarse aggregates, an antifoaming agent, water and an admixture as described above. Examples of the binder that may be used include (1) cement and (2) mixtures of cement and a microscopic powder admixture. In the above, examples of cement include (3) portland cement of different kinds such as normal portland cement, high early strength portland cement, moderate heat portland cement and low heat portland cement, (4) mixed cement of different kinds such as blast-furnace slag cement, fly ash cement and silica fume cement, and (5) alumina cement. Examples of the microscopic powder admixture in (2) above include blast-furnace slag microscopic powder, silica fume microscopic powder and fly ash microscopic powder. Among these, however, silica fume microscopic powder is preferred. As the binder, it is particularly preferable to use silica fume cement prepared by preliminarily mixing silica fume microscopic powder into low heat portland cement at a mixing rate of about 10%.

Examples of the antifoaming agent to be used according to this invention include aliphatic polyether type antifoaming agents and polyether modified silicone type antifoaming agents. Among these, however, aliphatic polyether type antifoaming agents which are inexpensive but have antifoaming effects even with a small amount are preferable. Examples of such aliphatic polyether type antifoaming agent include polyoxyalkyleneglycol monoalkyl (or alkenyl) ether obtained by adding ethylene oxide and propylene oxide to aliphatic alcohol with 16-20 carbon atoms. The invention does not impose any particular limitations on the content of the antifoaming agent but it is usually used at a rate of 0.02 weight % or less with respect to the binder in order to keep the air content of the concrete at the time of mixing with kneading as low as possible equal to or less than 2%.

Examples of fine aggregates include river sand, mountain sand, ocean sand and crushed sand. Examples of coarse aggregates include river stones, crushed stones and lightweight aggregates.

The water-to-binder ratio for ultra high-strength hydraulic cement compositions of this invention is 10-25% but it is preferable to keep it equal to or larger than 10% and less than 20%. The unit amount of the binder is within the range of 480-1800 kg/m$^3$ but it is preferable to keep it within the range of 600-1500 kg/m$^3$. The amount of the aforementioned admixture to be used is 0.2-3.5 weight parts per 100 weight parts of the binder but it is preferable to keep it within the range of 0.25-1.5 weight parts. Ultra high-strength hydraulic cement compositions of this invention within such limitations can simultaneously possess the plurality of originally desired characteristics.

Ultra high-strength hydraulic cement compositions of this invention may contain additives such as a hardening accelerator and a hardening retarder as well as a small amount of polypropylene fibers for improving resistance against fire and bursting within the limit of not adversely affecting the effects of the present invention. From the ultra high-strength hydraulic cement compositions of this invention, it is possible to obtain hardened objects with ultra high-strength having compressive strength exceeding 100N/mm$^2$ and a small autogeneous shrinkage.

Ultra high-strength hydraulic cement compositions of this invention can simultaneously satisfy many conditions such that the time required for kneading should be short, that the slump loss should be small, that the viscosity should be small, that hardened objects obtained therefrom should have a small autogeneous shrinkage and that hardened objects obtained therefrom should have a desired ultra high strength.

The invention is described next in terms of the following nineteen embodiments.

(1) Ultra high-strength hydraulic cement composition containing cement with 90 weight % of low heat portland cement and 10 weight % of silica fume microscopic powder (hereinafter referred to as silica fume cement) as the binder, fine aggregates, coarse aggregates, an antifoaming agent, water and Admixture (A-1) described below with the water-to-binder ratio of 20%, unit amount of water 160 kg/m$^3$ and unit amount of the binder 800 kg/m$^3$, 0.35 weight parts of Admixture (A-1) being contained per 100 weight parts of the binder, wherein Admixture (A-1) is a reaction mixture obtained by Process 1 and Process 2 described below:

Process 1: Process of initiating a radical copolymerization reaction of a radical polymerizable monomer mixture containing maleic anhydride and α-allyl-ω-methoxy-polyoxyethylene (molar number of oxyethylene units (=n) being 33) at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 83% and thereby obtaining reaction mixture containing produced copolymers with weight-average molecular weight of 38000 and residual monomers of maleic acid and α-allyl-ω-methoxy-poly (n=33)oxyethylene.

(2) Ultra high-strength hydraulic cement composition containing silica fume cement as the binder, fine aggregates, coarse aggregates, an antifoaming agent, water and Admixture (A-2) described below with the water-to-binder ratio of 20%, unit amount of water 160 kg/m$^3$ and unit amount of the binder 800 kg/m$^3$, 0.41 weight parts of Admixture (A-2) being contained per 100 weight parts of the binder, wherein Admixture (A-2) is a reaction mixture obtained by Process 1 and Process 2 described below:

Process 1: Process of initiating a radical copolymerization reaction of a radical polymerizable monomer mixture containing maleic anhydride and α-allyl-ω-methoxy-poly (n=68)oxyethylene at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 78% and thereby obtaining reaction mixture containing produced copolymers with weight-average molecular weight of 40300 and residual monomers of maleic acid and α-allyl-ω-methoxy-poly (n=68)oxyethylene.

(3) Ultra high-strength hydraulic cement composition containing silica fume cement as the binder, fine aggregates, coarse aggregates, an antifoaming agent, water and Admixture (A-3) described below with the water-to-binder ratio of 20%, unit amount of water 160 kg/m$^3$ and unit amount of the binder 800 kg/m$^3$, 0.34 weight parts of Admixture (A-3) being contained per 100 weight parts of the binder, wherein Admixture (A-3) is a reaction mixture obtained by Process 1 and Process 2 described below:

Process 1: Process of initiating a radical copolymerization reaction of a radical polymerizable monomer mixture containing maleic anhydride and α-allyl-ω-methoxy-poly (n=23)oxyethylene at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 77% and thereby obtaining reaction mixture containing produced copolymers with weight-average molecular weight of 35700 and residual monomers of maleic acid and α-allyl-ω-methoxy-poly (n=23)oxyethylene.

(4) Ultra high-strength hydraulic cement composition containing silica fume cement as the binder, fine aggregates, coarse aggregates, an antifoaming agent, water and Admixture (A-4) described below with the water-to-binder ratio of 20%, unit amount of water 160 kg/m$^3$ and unit amount of the binder 800 kg/m$^3$, 0.37 weight parts of Admixture (A-4) being contained per 100 weight parts of the binder, wherein Admixture (A-4) is a reaction mixture obtained by Process 1 and Process 2 described below:

Process 1: Process of initiating a radical copolymerization reaction of a radical polymerizable monomer mixture containing maleic anhydride and α-allyl-ω-methoxy-poly (n=50)oxyethylene at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 80% and thereby obtaining reaction mixture containing produced copolymers with weight-average molecular weight of 39000 and residual monomers of maleic acid and α-allyl-ω-methoxy-poly (n=50)oxyethylene.

(5) Ultra high-strength hydraulic cement composition containing silica fume cement as the binder, fine aggregates, coarse aggregates, an antifoaming agent, water and Admixture (A-6) described below with the water-to-binder ratio of 20%, unit amount of water 160 kg/m$^3$ and unit amount of the binder 800 kg/m$^3$, 0.46 weight parts of Admixture (A-6) being contained per 100 weight parts of the binder, wherein Admixture (A-6) is a reaction mixture obtained by Process 1 and Process 2 described below:

Process 1: Process of initiating a radical copolymerization reaction of a radical polymerizable monomer mixture containing maleic anhydride and α-allyl-ω-methoxy-poly (n=80)oxyethylene-polyoxypropylene (molar number of oxypropylene units (=m) being 5) at molar ratio of 55/45 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 68% and thereby obtaining reaction mixture containing produced copolymers with weight-average molecular weight of 34000 and residual monomers of maleic acid and α-allyl-ω-methoxy-poly (n=80)oxyethylene-poly(m=5)oxypropylene.

(6) Ultra high-strength hydraulic cement composition containing silica fume cement as the binder, fine aggregates, coarse aggregates, an antifoaming agent, water and Admixture (A-7) described below with the water-to-binder ratio of 20%, unit amount of water 160 kg/m$^3$ and unit amount of the binder 800 kg/m$^3$, 0.33 weight parts of Admixture (A-7) being contained per 100 weight parts of the binder, wherein Admixture (A-7) is a reaction mixture obtained by Process 1 and Process 2 described below:

Process 1: Process of initiating a radical copolymerization reaction of a radical polymerizable monomer mixture containing maleic anhydride and α-allyl-ω-methoxy-poly (n=80)oxyethylene-poly(m=5)oxypropylene at molar ratio of 65/35 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 75% and thereby obtaining reaction mixture containing produced copolymers with weight-average molecular weight of 37000 and residual monomers of maleic acid and α-allyl-ω-methoxy-poly (n=80)oxyethylene-poly(m=5)oxypropylene.

(7) Ultra high-strength hydraulic cement composition containing silica fume cement as the binder, fine aggregates, coarse aggregates, an antifoaming agent, water and Admixture (A-8) described below with the water-to-binder ratio of 20%, unit amount of water 160 kg/m$^3$ and unit amount of the binder 800 kg/m$^3$, 0.37 weight parts of Admixture (A-8) being contained per 100 weight parts of the binder, wherein Admixture (A-8) is a partially neutralized object obtained by Process 1, Process 2 and Process 3 described below:

Process 1: Process of initiating a radical copolymerization reaction of a radical polymerizable monomer mixture containing maleic anhydride and α-allyl-ω-methoxy-poly (n=33)oxyethylene at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 83% and thereby obtaining reaction mixture containing produced copolymers with weight-average molecular weight of 38000 and residual monomers of maleic acid and α-allyl-ω-methoxy-poly (n=33)oxyethylene.

Process 3: Process of partially neutralizing the reaction mixture obtained in Process 2 with sodium hydroxide and thereby obtaining partially neutralized object of this reaction mixture.

(8) Ultra high-strength hydraulic cement composition containing silica fume cement as the binder, fine aggregates, coarse aggregates, an antifoaming agent, water and Admixture (A-9) described below with the water-to-binder ratio of 20%, unit amount of water 160 kg/m$^3$ and unit amount of the binder 800 kg/m$^3$, 0.4 weight parts of Admixture (A-9) being contained per 100 weight parts of the binder, wherein Admixture (A-9) is a completely neutralized object obtained by Process 1, Process 2 and Process 3 described below:

Process 1: Process of initiating a radical copolymerization reaction of a radical polymerizable monomer mixture containing maleic anhydride and α-allyl-ω-methoxy-poly (n=80)oxyethylene-poly(m=5)oxypropylene at molar ratio of 60/40 in a non-aqueous system without using any solvent and in the presence of azobisisobutyronitrile.

Process 2: Process of stopping the radical copolymerization reaction initiated in Process 1 in its midst by adding water to its reaction system when the inversion rate of polymerization defined above becomes 80% and thereby obtaining reaction mixture containing produced copolymers with weight-average molecular weight of 39000 and residual monomers of maleic acid and α-allyl-ω-methoxy-poly (n=80)oxyethylene-poly(m=5)oxypropylene.

Process 3: Process of completely neutralizing the reaction mixture obtained in Process 2 with sodium hydroxide and thereby obtaining completely neutralized object of this reaction mixture.

(9) Ultra high-strength hydraulic cement composition containing silica fume cement as the binder, fine aggregates, coarse aggregates, an antifoaming agent, water and Admixture (A-1) described below with the water-to-binder ratio of 17%, unit amount of water 160 kg/m$^3$ and unit amount of the binder 941 kg/m$^3$, 0.43 weight parts of Admixture (A-1) being contained per 100 weight parts of the binder.

(10) Ultra high-strength hydraulic cement composition containing silica fume cement as the binder, fine aggregates, coarse aggregates, an antifoaming agent, water and Admixture (A-3) described below with the water-to-binder ratio of 17%, unit amount of water 160 kg/m$^3$ and unit amount of the binder 941 kg/m$^3$, 0.42 weight parts of Admixture (A-3) being contained per 100 weight parts of the binder.

(11) Ultra high-strength hydraulic cement composition containing silica fume cement as the binder, fine aggregates, coarse aggregates, an antifoaming agent, water and Admixture (A-6) described below with the water-to-binder ratio of 17%, unit amount of water 160 kg/m$^3$ and unit amount of the binder 941 kg/m$^3$, 0.57 weight parts of Admixture (A-6) being contained per 100 weight parts of the binder.

(12) Ultra high-strength hydraulic cement composition containing silica fume cement as the binder, fine aggregates, coarse aggregates, an antifoaming agent, water and Admixture (A-7) described below with the water-to-binder ratio of 17%, unit amount of water 160 kg/m$^3$ and unit amount of the binder 941 kg/m$^3$, 0.42 weight parts of Admixture (A-7) being contained per 100 weight parts of the binder.

(13) Ultra high-strength hydraulic cement composition containing silica fume cement as the binder, fine aggregates, coarse aggregates, an antifoaming agent, water and Admixture (A-8) described below with the water-to-binder ratio of 17%, unit amount of water 160 kg/m$^3$ and unit amount of the binder 941 kg/m$^3$, 0.44 weight parts of Admixture (A-8) being contained per 100 weight parts of the binder.

(14) Ultra high-strength hydraulic cement composition containing silica fume cement as the binder, fine aggregates, coarse aggregates, an antifoaming agent, water and Admixture (A-1) described below with the water-to-binder ratio of 14%, unit amount of water 160 kg/m$^3$ and unit amount of the binder 1143 kg/m$^3$, 0.70 weight parts of Admixture (A-1) being contained per 100 weight parts of the binder.

(15) Ultra high-strength hydraulic cement composition containing silica fume cement as the binder, fine aggregates, coarse aggregates, an antifoaming agent, water and Admixture (A-3) described below with the water-to-binder ratio of 14%, unit amount of water 160 kg/m$^3$ and unit amount of the binder 1143 kg/m$^3$, 0.68 weight parts of Admixture (A-3) being contained per 100 weight parts of the binder.

(16) Ultra high-strength hydraulic cement composition containing silica fume cement as the binder, fine aggregates, coarse aggregates, an antifoaming agent, water and Admixture (A-8) described below with the water-to-binder ratio of 14%, unit amount of water 160 kg/m$^3$ and unit amount of the binder 1143 kg/m$^3$, 0.73 weight parts of Admixture (A-8) being contained per 100 weight parts of the binder.

(17) Ultra high-strength hydraulic cement composition containing a mixture of silica fume cement and silica fume microscopic powder as the binder, fine aggregates, coarse aggregates, an antifoaming agent, water and Admixture (A-1) described below with the water-to-binder ratio of 14%, unit amount of water 160 kg/m$^3$ and unit amount of the binder 1016 kg/m$^3$, 0.76 weight parts of Admixture (A-1) being contained per 100 weight parts of the binder.

(18) Ultra high-strength hydraulic cement composition containing a mixture of silica fume cement and silica fume microscopic powder as the binder, fine aggregates, coarse aggregates, an antifoaming agent, water and Admixture (A-3) described below with the water-to-binder ratio of 14%, unit amount of water 160 kg/m$^3$ and unit amount of the binder 1143 kg/m$^3$, 0.70 weight parts of Admixture (A-3) being contained per 100 weight parts of the binder.

(19) Ultra high-strength hydraulic cement composition containing a mixture of silica fume cement and silica fume microscopic powder as the binder, fine aggregates, coarse aggregates, an antifoaming agent, water and Admixture (A-8) described below with the water-to-binder ratio of 14%, unit amount of water 160 kg/m$^3$ and unit amount of the binder 1143 kg/m$^3$, 0.78 weight parts of Admixture (A-8) being contained per 100 weight parts of the binder.

TEST EXAMPLES

In what follows, some test examples are shown in order to further explain the invention and its effects but these examples are not intended to limit the scope of the invention.

Part 1 (Synthesis of Admixtures)

Synthesis of Admixture (A-1)

Maleic anhydride 147 g (1.5 moles) and α-allyl-ω-methoxy-poly(n=33)oxyethylene 1524 g (1.0 mole) were placed inside a reactor and after they were dissolved uniformly with stirring, the atmosphere was replaced with nitrogen. While the reacting system was maintained at 80° C. with a hot water bath, azobisisobutylonitrile 5.8 g was added to start a radical polymerization reaction. After 2 hours of the radical copolymerization process, it was stopped by adding 80 g of water to the reacting system to obtain a reaction mixture. This reaction mixture was analyzed by GPC and found as a result to contain copolymer with weight-average molecular weight of 38000 with a constituent unit formed with maleic acid and a constituent unit with α-allyl-ω-methoxy-poly(n=33)oxyethylene, maleic acid and α-allyl-ω-methoxy-poly(n=33)oxyethylene, and its inversion ratio of polymerization defined above was 83%. This reaction mixture is referred to as Admixture (A-1).

Figure 1:
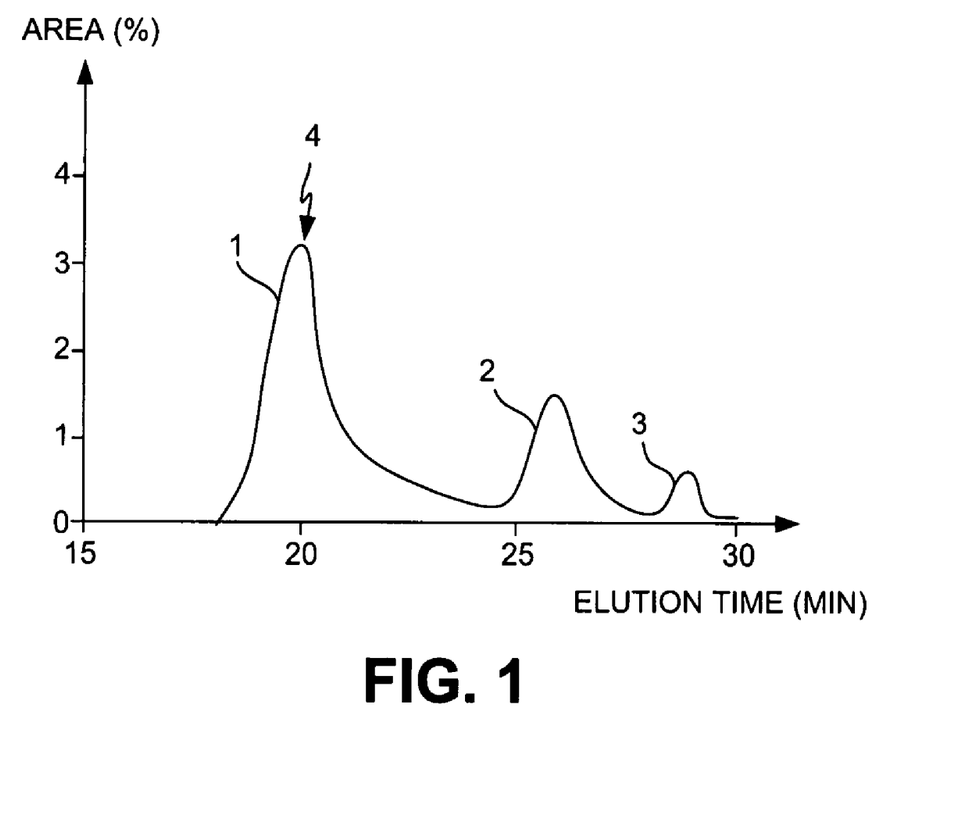
FIG. 1 is a graph obtained from a reaction mixture obtained as the admixture of this invention when it was analyzed by gel-permeation chromatography.

FIG. 1 shows the GPC graph of the reaction mixture of Admixture (A-1). In FIG. 1, numeral 1 indicates the peak of the generated copolymer, numeral 2 indicates the peak of α-allyl-ω-methoxy-poly(n=33)oxyethylene, numeral 3 indicates the peak of maleic acid and numeral 4 shows the peak top.

Syntheses of Admixtures (A-2)-(A-7)

Admixtures (A-2)-(A-7) were synthesized similarly as explained above.

Synthesis of Admixture (A-8)

A 40% aqueous solution 500 g of aforementioned Admixture (A-1) was placed inside a reactor and a 30% aqueous solution of sodium hydroxide 29 g was gradually added with stirring to carry out partial neutralization and to thereby obtain partially neutralized object of reaction mixture with degree of neutralization 60%. This is referred to as Admixture (A-8).

Synthesis of Admixture (A-9)

A 40% aqueous solution 500 g of aforementioned Admixture (A-4) was placed inside a reactor and a 30% aqueous solution of sodium hydroxide 32.7 g was gradually added with stirring to carry out complete neutralization and to thereby obtain completely neutralized object of reaction mixture with degree of neutralization 100%. This is referred to as Admixture (A-9).

Synthesis of Admixture (R-1)

Maleic anhydride 147 g (1.5 moles) and α-allyl-ω-methoxy-poly(n=33)oxyethylene 1524 g (1.0 mole) were placed inside a reactor and after they were dissolved uniformly with stirring, the atmosphere was replaced with nitrogen. While the reacting system was maintained at 80° C. with a hot water bath, azobisisobutylonitrile 5.8 g was added to start a radical polymerization reaction. After 50 minutes of the radical copolymerization process, it was stopped by adding 80 g of water to the reacting system to obtain a reaction mixture. This reaction mixture is referred to as Admixture (R-1).

Syntheses of Admixtures (R-2)-(R-7)

Admixtures (R-2)-(R-7) were synthesized similarly as explained above re Admixture (R-1).

Synthesis of Admixture (R-8)

As done for Admixture (A-9), Admixture (R-2) was completely neutralized with sodium hydroxide to obtain completely neutralized object. This is referred to as Admixture (R-8).

Details of these Admixtures obtained as above are summarized in Table 1.

TABLE 1

| Kind of Admixtures | Process 1 Monomers (molar %) | | | | Process 2 | Process 3 |
|---|---|---|---|---|---|---|
| | (X) Maleic anhydride (molar %) | (Y) Monomers of Formula 1 (Kind/molar %) | (X)/(Y) Molar ratio | IRP (%) | Weight-average molecular weight of copolymer | Basic compound used |
| Text Example | | | | | | |
| A-1 | 60 | d-1/40 | 60/40 | 83 | 38000 | |
| A-2 | 60 | d-2/40 | 60/40 | 78 | 40300 | |
| A-3 | 60 | d-3/40 | 60/40 | 77 | 35700 | |
| A-4 | 60 | d-4/40 | 60/40 | 80 | 39000 | |
| A-5 | 57 | d-5/40 d-6/3 | 57/43 | 70 | 40800 | |
| A-6 | 55 | d-5/45 | 55/45 | 68 | 34000 | |
| A-7 | 65 | d-5/35 | 65/35 | 75 | 37000 | |
| A-8 | 60 | d-1/40 | 60/40 | 83 | 38000 | NaOH |
| A-9 | 60 | d-4/40 | 60/40 | 80 | 39000 | NaOH |
| Comparison Example | | | | | | |
| R-1 | 60 | d-1/40 | 60/40 | 43 | 29500 | |
| R-2 | 60 | d-1/40 | 60/40 | 92 | 50000 | |
| R-3 | 60 | d-4/40 | 60/40 | 93 | 53500 | |
| R-4 | 60 | d-5/40 | 60/40 | 95 | 57500 | |
| R-5 | 60 | dr-1/40 | 60/40 | 94 | 66700 | |
| R-6 | 45 | d-5/55 | 45/55 | 69 | 35000 | |
| R-7 | 75 | d-5/25 | 75/25 | 76 | 39000 | |
| R-8 | 60 | d-1/40 | 60/40 | 92 | 50000 | NaOH |

In Table 1:
IRP: Inversion rate of polymerization
d-1: α-allyl-ω-methoxy-poly(n = 33)oxyethylene
d-2: α-allyl-ω-methoxy-poly(n = 68)oxyethylene
d-3: α-allyl-ω-acetoxy-poly(n = 23)oxyethylene
d-4: α-allyl-ω-acetoxy-poly(n = 50)oxyethylene
d-5: α-allyl-ω-hydroxy-poly(n = 80)oxyethylene-poly(m = 5)oxypropylene
d-6: Styrene
dr-1: α-allyl-ω-acetoxy-poly(n = 170)oxyethylene Part 2 (Preparation and Evaluation of Ultra High-Strength Hydraulic Cement Compositions)

Test Examples 1-23 and Comparison Examples 1-27 (Preparation of Ultra High-Strength Hydraulic Cement Compositions)

Mixtures were kneaded together under the conditions shown in Table 2. For Mixtures Nos. 1-3, silica fume cement (Produced by Ube Mitsubishi Corporation; specific weight=3.08, blaine value=5600), fine aggregates (Ooi-gawa River sand with specific weight=2.58) and coarse aggregates (crushed stones from Okazaki with specific weight=2.68) were sequentially added into a forced-mixing pan-type mixer with capacity 50 liters and subjected to a free kneading process for 15 seconds. Next, the admixtures prepared in Part 1 and described in Table 1 were each added and aliphatic polyether type antifoaming agent (tradename of AFK-2 produced by Takemoto Yushi Kabushiki Kaisha) was kneaded together and added with water so as to be 0.01 weight parts per 100 weight parts of the binder and such that the target slump flow would be 65±5 cm and the target air content would be 2% or less. The mixture was kneaded together for 300 seconds for Mixture Nos. 1 and 2 and for 500 seconds for Mixture No. 3. For Mixture No. 4, kneading was carried out similarly as done for Mixture No. 3 except that use as the binder was made of a mixture of the aforementioned silica fume cement and silica fume microscopic powder (normal portland cement (tradename of Micro Silica 940U produced by Elkem Inc.; specific weight=2.20, blaine value=140000).

TABLE 2

| Mixture | Water/binder ratio (%) | Weight % of silica fume in binder | Ratio of Fine aggregates (%) | Unit amount (kg/m³) | | | | |
|---|---|---|---|---|---|---|---|---|
| | | | | Water | Binder Silica fume cement | Silica fume | Fine aggregates | Coarse aggregates |
| No. 1 | 20 | 10 | 41.1 | 160 | 800 | — | 593 | 884 |
| No. 2 | 17 | 10 | 35.8 | 160 | 941 | — | 475 | 884 |

TABLE 2-continued

| Mixture | Weight Water/binder ratio (%) | % of silica fume in binder | Ratio of Fine aggregates (%) | Unit amount (kg/m³) Water | Binder Silica fume cement | Silica fume | Fine aggregates | Coarse aggregates |
|---|---|---|---|---|---|---|---|---|
| No. 3 | 14 | 10 | 26.5 | 160 | 1143 | — | 307 | 884 |
| No. 4 | 14 | 20 | 26.5 | 160 | 1016 | 127 | 296 | 852 |

Evaluation of Ultra High-Strength Hydraulic Cement Compositions

For each of the ultra high-strength hydraulic cement compositions thus prepared, the time for kneading, the slump flow, the air content and the L-flow velocity immediately after the kneading, as well as the slump flow and the air content 90 minutes after the kneading, the autogeneous shrinkage strain and the compressive strength were obtained as below. The results are shown together in Tables 3-8.

Slump flow: Measured according to JIS-A1150 on ultra high-strength hydraulic cement compositions immediately after kneading and after 90 minutes of kneading and being left quietly on a boat.

Air content: Measured according to JIS-A1128 on ultra high-strength hydraulic cement compositions immediately after kneading and after 90 minutes of kneading and being left quietly on a boat.

Kneading time: A clamp meter (an electric current meter) was connected to the forced-mixing pan-type mixer to record the time of kneading and the waveform of the load current of the mixer by means of a recorder and the time required for the load current to reach the maximum value was recorded as the kneading time.

L-flow velocity: Measured by using an L-flow meter (described in "Recommendations for Mix Design and Construction Practice of High Fluidity Concrete" by Architectural Institute of Japan). The flow speed between 5 cm and 10 cm from the flow-starting surface of the L-flow meter was defined as the flow speed. If the slump flow is the same, a large initial L-flow speed corresponds to a low viscosity.

Autogeneous shrinkage strain: Measured at material ages of 1 day and 28 days according to the description in "Test Method for Autogeneous Shrinkage and Autogeneous Expansion of Concrete" by Autogeneous Shrinkage Research Committee of the Japan Concrete Institute. A smaller numerical value of autogeneous shrinkage strain indicates a smaller antogeneous shrinkage. Since the autogeneous shrinkage strain tends to become large for ultra high-strength hydraulic cement compositions with a small water-to-cement ratio, it is necessary to compare the autogeneous shrinkage strain values among ultra high-strength hydraulic cement compositions with the same water-to-cement ratio.

Compressive strength: Measured at material ages of 7 days and 28 days according to JIS-A1108.

TABLE 3

| | | | | Immediately after kneading | | | After 90 minutes | |
|---|---|---|---|---|---|---|---|---|
| | Mixture No. in Table 2 | Admixture Kind/ Amount | Kneading time (sec) | L-flow velocity (cm/s) | Slump flow (cm) | Air content (%) | Slump flow (cm) | Air content (%) |
| Test Examples | | | | | | | | |
| 1 | 1 | A-1/0.35 | 85 | 9.0 | 67.5 | 1.9 | 57.8 | 1.7 |
| 2 | 1 | A-2/0.41 | 92 | 8.8 | 67.0 | 1.6 | 59.5 | 1.7 |
| 3 | 1 | A-3/0.34 | 83 | 9.1 | 68.4 | 1.9 | 57.6 | 1.8 |
| 4 | 1 | A-4/0.37 | 90 | 8.9 | 68.1 | 1.7 | 58.0 | 1.6 |
| 5 | 1 | A-5/0.48 | 103 | 8.0 | 69.0 | 1.7 | 56.3 | 1.5 |
| 6 | 1 | A-6/0.46 | 100 | 8.8 | 67.5 | 2.0 | 60.0 | 1.9 |
| 7 | 1 | A-7/0.33 | 83 | 8.7 | 67.0 | 1.9 | 56.2 | 1.8 |
| 8 | 1 | A-8/0.37 | 97 | 8.8 | 67.2 | 1.8 | 57.5 | 1.7 |
| 9 | 1 | A-9/0.40 | 95 | 8.9 | 68.3 | 1.7 | 57.5 | 1.6 |
| Comparison Examples | | | | | | | | |
| 1 | 1 | R-1/*3 | — | — | — | — | — | — |
| 2 | 1 | R-2/0.39 | 183 | 4.8 | 66.3 | 1.9 | 47.3 | 1.7 |
| 3 | 1 | R-3/0.41 | 195 | 4.7 | 66.0 | 1.7 | 46.5 | 1.8 |
| 4 | 1 | R-4/*3 | — | — | — | — | — | — |
| 5 | 1 | R-5/*3 | — | — | — | — | — | — |
| 6 | 1 | R-6/*3 | — | — | — | — | — | — |

TABLE 3-continued

| Mixture No. in Table 2 | Admixture Kind/ Amount | Kneading time (sec) | Immediately after kneading ||| After 90 minutes ||
|---|---|---|---|---|---|---|---|
| | | | L-flow velocity (cm/s) | Slump flow (cm) | Air content (%) | Slump flow (cm) | Air content (%) |
| 7 | 1 | R-7/0.35 | 178 | 4.8 | 66.5 | 1.9 | 45.0 | 1.8 |
| 8 | 1 | R-8/0.40 | 180 | 4.9 | 67.0 | 1.8 | 47.4 | 1.7 |

In Table 3:
Amount of admixture": Added weight part as solid component of admixture per 100 weight parts of cement;
*3: Target flow value was not obtained for lack of fluidity although the added amount was increased;

TABLE 4

| | Mixture No. in Table 2 | Admixture Kind/ Amount | Kneading time (sec) | Immediately after kneading ||| After 90 minutes ||
|---|---|---|---|---|---|---|---|---|
| | | | | L-flow velocity (cm/s) | Slump flow (cm) | Air content (%) | Slump flow (cm) | Air content (%) |
| Test Examples | | | | | | | | |
| 10 | 2 | A-1/0.43 | 97 | 6.2 | 68.7 | 1.9 | 58.6 | 1.6 |
| 11 | 2 | A-3/0.42 | 92 | 6.3 | 67.3 | 1.8 | 57.8 | 1.7 |
| 12 | 2 | A-5/0.56 | 110 | 6.0 | 67.6 | 1.7 | 57.3 | 1.5 |
| 13 | 2 | A-6/0.57 | 104 | 6.3 | 67.8 | 1.7 | 58.8 | 1.7 |
| 14 | 2 | A-7/0.42 | 90 | 6.0 | 68.2 | 1.8 | 56.3 | 1.7 |
| 15 | 2 | A-8/0.44 | 94 | 6.5 | 68.9 | 1.7 | 60.2 | 1.9 |
| Comparison Examples | | | | | | | | |
| 9 | 2 | R-1/*3 | — | — | — | — | — | — |
| 10 | 2 | R-2/0.65 | 216 | 4.3 | 65.4 | 1.8 | 47.4 | 1.7 |
| 11 | 2 | R-3/0.73 | 235 | 4.2 | 67.2 | 1.7 | 49.5 | 1.7 |
| 12 | 2 | R-4/*3 | — | — | — | — | — | — |
| 13 | 2 | R-5/*3 | — | — | — | — | — | — |
| 14 | 2 | R-6/*3 | — | — | — | — | — | — |
| 15 | 2 | R-7/0.60 | 205 | 4.6 | 66.2 | 1.8 | 47.2 | 1.8 |
| 16 | 2 | R-8/0.66 | 227 | 4.4 | 65.9 | 1.9 | 48.2 | 1.7 |
| 17 | 2 | R-9/0.73 | 270 | 3.2 | 66.3 | 1.9 | 46.5 | 1.8 |
| 18 | 2 | R-10/0.59 | 243 | 4.0 | 67.0 | 1.8 | 43.0 | 1.9 |
| 19 | 2 | R-11/0.75 | 265 | 3.5 | 65.8 | 2.0 | 42.6 | 1.8 |
| 20 | 2 | R-12/0.58 | 283 | 2.3 | 65.3 | 1.9 | 48.9 | 1.9 |

In Table 4:
R-9: Mixture of Admixture (R-2) and monomer (d-1) at solid component weight ratio of 80/20;
R-10: Mixture of Admixture (R-2) and maleic acid at solid component weight ratio of 97.5/2.5;
R-11: Mixture of Admixture (R-2), monomer (d-1) and maleic acid at solid component weight ratio of 80/17.5/2.5;
R-12: High-range water reducing agent for ultra high-strength hydraulic cement compositions (tradename: Chupol SSP-104, produced by Takemoto Yushi Kabushiki Kaisha).

TABLE 5

| | Mixture No. in Table 2 | Admixture Kind/ Amount | Kneading time (sec) | Immediately after kneading ||| After 90 minutes ||
|---|---|---|---|---|---|---|---|---|
| | | | | L-flow velocity (cm/s) | Slump flow (cm) | Air content (%) | Slump flow (cm) | Air content (%) |
| Test Examples | | | | | | | | |
| 16 | 3 | A-1/0.70 | 165 | 5.1 | 69.1 | 1.8 | 60.3 | 1.8 |
| 17 | 3 | A-3/0.68 | 159 | 5.2 | 67.6 | 1.6 | 59.5 | 1.5 |
| 18 | 3 | A-5/0.84 | 170 | 5.0 | 68.3 | 1.8 | 60.4 | 1.7 |
| 19 | 3 | A-8/0.73 | 162 | 5.3 | 68.0 | 1.7 | 60.5 | 1.6 |

TABLE 5-continued

| | | | Immediately after kneading | | | After 90 minutes | |
|---|---|---|---|---|---|---|---|
| Mixture No. in Table 2 | Admixture Kind/ Amount | Kneading time (sec) | L-flow velocity (cm/s) | Slump flow (cm) | Air content (%) | Slump flow (cm) | Air content (%) |
| Comparison Examples | | | | | | | |
| 21 | 3 | R-1/*3 | — | — | — | — | — | — |
| 22 | 3 | R-2/1.35 | 580 | 2.1 | 65.8 | 2.0 | 41.5 | 1.8 |
| 23 | 3 | R-3/*3 | — | — | — | — | — | — |
| 24 | 3 | R-4/*3 | — | — | — | — | — | — |
| 25 | 3 | R-5/*3 | — | — | — | — | — | — |
| 26 | 3 | R-6/*3 | — | — | — | — | — | — |
| 27 | 3 | R-7/1.25 | 505 | 2.3 | 65.0 | 1.9 | 40.0 | 1.9 |
| Test Examples | | | | | | | |
| 20 | 4 | A-1/0.76 | 144 | 5.3 | 69.3 | 1.8 | 61.0 | 1.5 |
| 21 | 4 | A-3/0.70 | 152 | 5.5 | 68.4 | 1.7 | 63.5 | 1.6 |
| 22 | 4 | A-5/0.91 | 163 | 5.1 | 67.9 | 1.7 | 63.0 | 1.5 |
| 23 | 4 | A-8/0.78 | 157 | 5.4 | 68.8 | 1.8 | 62.8 | 1.6 |

TABLE 6

| | Autogeneous shrinkage strain ($\times 10^{-4}$) | | Compressive strength (N/mm$^2$) | |
|---|---|---|---|---|
| | Age 1 day | Age 28 days | Age 7 days | Age 28 days |
| Test Examples | | | | |
| 1 | 2.9 | 4.5 | 86 | 130 |
| 2 | 3.0 | 4.6 | 85 | 128 |
| 3 | 2.8 | 4.5 | 85 | 129 |
| 4 | 2.8 | 4.4 | 86 | 131 |
| 5 | 3.0 | 4.6 | 87 | 132 |
| 6 | 2.8 | 4.4 | 84 | 129 |
| 7 | 3.0 | 4.5 | 87 | 133 |
| 8 | 2.9 | 4.5 | 85 | 130 |
| 9 | 2.8 | 4.5 | 86 | 131 |
| Comparison Examples | | | | |
| 1 | — | — | — | — |
| 2 | 3.6 | 5.5 | 81 | 124 |
| 3 | 3.7 | 5.6 | 79 | 121 |
| 4 | — | — | — | — |
| 5 | — | — | — | — |
| 6 | — | — | — | — |
| 7 | 3.7 | 5.6 | 81 | 123 |
| 8 | 3.7 | 5.6 | 80 | 122 |

TABLE 7

| | Autogeneous shrinkage strain ($\times 10^{-4}$) | | Compressive strength (N/mm$^2$) | |
|---|---|---|---|---|
| | Age 1 day | Age 28 days | Age 7 days | Age 28 days |
| Test Examples | | | | |
| 10 | 3.4 | 5.3 | 105 | 143 |
| 11 | 3.3 | 5.1 | 103 | 142 |
| 12 | 3.5 | 5.4 | 106 | 145 |
| 13 | 3.3 | 5.2 | 103 | 143 |
| 14 | 3.5 | 5.3 | 105 | 145 |
| 15 | 3.4 | 5.3 | 102 | 141 |
| Comparison Examples | | | | |
| 9 | — | — | — | — |
| 10 | 4.2 | 6.6 | 98 | 137 |
| 11 | 4.2 | 6.7 | 96 | 135 |
| 12 | — | — | — | — |
| 13 | — | — | — | — |
| 14 | — | — | — | — |
| 15 | 4.3 | 6.9 | 95 | 133 |
| 16 | 5.1 | 7.8 | 105 | 144 |
| 17 | 4.0 | 6.5 | 97 | 135 |
| 18 | 4.1 | 6.5 | 95 | 133 |
| 19 | 4.0 | 6.4 | 97 | 135 |
| 20 | 4.4 | 6.9 | 99 | 139 |

TABLE 8

| | Autogeneous shrinkage strain ($\times 10^{-4}$) | | Compressive strength (N/mm$^2$) | |
|---|---|---|---|---|
| | Age 1 day | Age 28 days | Age 7 days | Age 28 days |
| Test Examples | | | | |
| 16 | 4.0 | 6.2 | 110 | 151 |
| 17 | 3.9 | 6.0 | 112 | 153 |
| 18 | 4.1 | 6.3 | 111 | 151 |
| 19 | 4.0 | 6.2 | 113 | 155 |
| Comparison Examples | | | | |
| 21 | — | — | — | — |
| 22 | 5.1 | 7.8 | 105 | 144 |
| 23 | — | — | — | — |
| 24 | — | — | — | — |
| 25 | — | — | — | — |
| 26 | — | — | — | — |
| 27 | 5.2 | 7.8 | 107 | 145 |

TABLE 8-continued

| | Autogeneous shrinkage strain (×10⁻⁴) | | Compressive strength (N/mm²) | |
|---|---|---|---|---|
| | Age 1 day | Age 28 days | Age 7 days | Age 28 days |
| Test Examples | | | | |
| 20 | 4.3 | 6.4 | 117 | 158 |
| 21 | 4.1 | 6.2 | 115 | 157 |
| 22 | 4.3 | 6.4 | 118 | 160 |
| 23 | 4.3 | 6.5 | 117 | 157 |

What is claimed is:

1. An ultra high-strength hydraulic cement composition comprising a binder, fine aggregates, coarse aggregates, an antifoaming agent, water and an admixture, said hydraulic cement composition containing water and said binder at a weight ratio of 10-25%, having a unit amount of said binder 480-1800 kg/m³ and containing 0.2-3.5 weight parts of said admixture per 100 weight parts of said binder, said binder being cement or a mixture of cement and a microscopic powder admixture, said admixture comprising one or more selected from the group consisting of reaction mixtures obtained by Process 1 and Process 2 and partially or completely neutralized substances of said reaction mixtures obtained by said Process 1, said Process 2 and also Process 3 wherein said Process 1 is a process of initiating a radical copolymerization process of a radical polymerizable monomer mixture containing maleic anhydride and a monomer shown by Formula 1 by 97 molar % or more at a molar ratio of 50/50-70/30 in a non-aqueous system in the presence of a non-aqueous radical initiator, said Process 2 is a process of stopping the radical copolymerization reaction initiated in said Process 1 in the midst of the reaction when the inversion rate of polymerization defined by $\{(TM-UM)/TM\} \times 100$ has become 50-90% by adding water to the reaction system and thereby obtaining a reaction mixture containing a copolymer thus produced and residual monomers, TM indicating the total weight of the radical polymerizable monomer mixture at the start of the radical polymerization reaction in said Process 1 and UM indicating the total weight of the residual monomers when the radical copolymerization reaction is stopped in said Process 2, said Process 3 is a process of partially or completely neutralizing the reaction mixture obtained in said Process 2 by one or two selected from the group consisting of alkali metal hydroxides, alkali earth metal hydroxides and amines, and said Formula 1 is given by $CH_2=CH-CH_2-O-A-O-R$ where R is methyl group, acetyl group or hydrogen atom and A is a residual group obtained by removing all hydroxyl groups from (poly)alkyleneglycol having (poly)oxyalkylene groups formed with 1-150 oxyethylene units or a total of 2-150 oxyethylene and oxypropylene units.

2. The ultra high-strength hydraulic cement composition of claim 1 wherein said Process 1 is a process of initiating a radical copolymerization process of a radical polymerizable monomer mixture without using any solvent in a non-aqueous system.

3. The ultra high-strength hydraulic cement composition of claim 1 wherein said reaction mixture of said Process 2 is obtained by stopping said radical copolymerization reaction in the midst of the reaction while the inversion rate of polymerization is 65-85%.

4. The ultra high-strength hydraulic cement composition of claim 2 wherein said reaction mixture of said Process 2 is obtained by stopping said radical copolymerization reaction in the midst of the reaction while the inversion rate of polymerization is 65-85%.

5. The ultra high-strength hydraulic cement composition of claim 1 wherein said Process 2 produces as reaction product copolymers with the top of peak of pullulan converted weight-average molecular weight of 30000-45000 in a measurement by gel-permeation chromatography.

6. The ultra high-strength hydraulic cement composition of claim 4 wherein said Process 2 produces as reaction product copolymers with the top of peak of pullulan converted weight-average molecular weight of 30000-45000 in a measurement by gel-permeation chromatography.

7. The ultra high-strength hydraulic cement composition of claim 1 wherein R is methyl group or acetyl group and A is residual group obtained by removing all hydroxyl groups from polyethyleneglycol having polyoxyethylene group with 15-90 oxyethylene units in said Formula 1.

8. The ultra high-strength hydraulic cement composition of claim 6 wherein R is methyl group or acetyl group and A is residual group obtained by removing all hydroxyl groups from polyethyleneglycol having polyoxyethylene group with 15-90 oxyethylene units in said Formula 1.

9. The ultra high-strength hydraulic cement composition of claim 1 wherein said cement is silica fume cement.

10. The ultra high-strength hydraulic cement composition of claim 8 wherein said cement is silica fume cement.

11. The ultra high-strength hydraulic cement composition of claim 1 wherein said microscopic powder admixture comprises silica fume microscopic powder.

12. The ultra high-strength hydraulic cement composition of claim 10 wherein said microscopic powder admixture comprises silica fume microscopic powder.

13. The ultra high-strength hydraulic cement composition of claim 1 wherein the unit amount of said binder is 600-1500 kg/m³.

14. The ultra high-strength hydraulic cement composition of claim 12 wherein the unit amount of said binder is 600-1500 kg/m³.

15. The ultra high-strength hydraulic cement composition of claim 1 containing water and said binder at a ratio equal to or greater than 10% and less than 20%.

16. The ultra high-strength hydraulic cement composition of claim 14 containing water and said binder at a ratio equal to or greater than 10% and less than 20%.

* * * * *